United States Patent Office 2,973,794
Patented Mar. 7, 1961

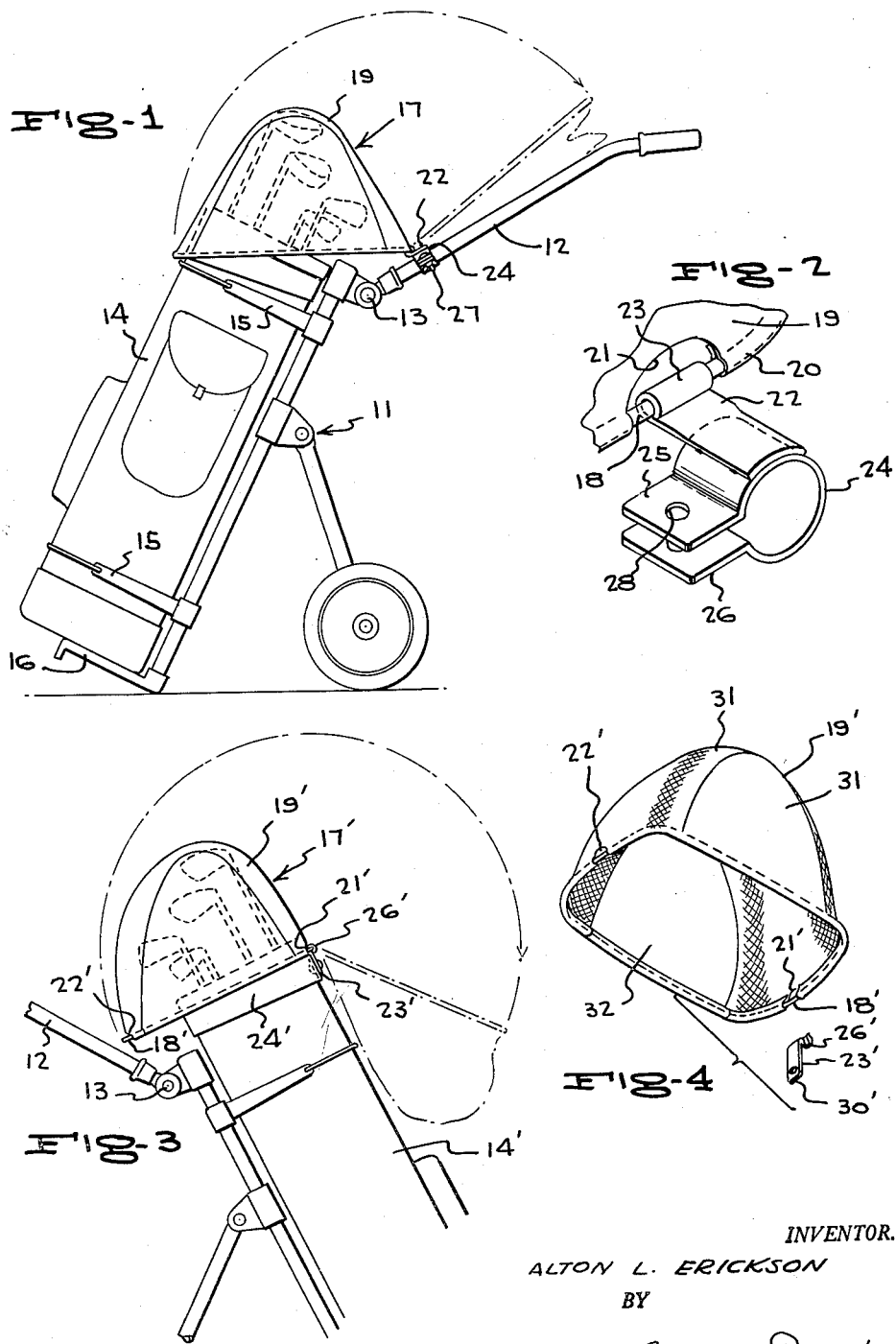

2,973,794

HOOD FOR GOLF CART

Alton L. Erickson, 1425 Oak St., Eugene, Oreg.

Filed Mar. 27, 1959, Ser. No. 802,418

1 Claim. (Cl. 150—52)

This invention relates to protective covers, and more particularly to a protective cover device for use in covering the top end of a golf bag and being particularly adapted for use on a golf cart.

The main object of the invention is to provide a novel and improved golf bag cover device which is simple in construction, which is easy to install, and which provides a simple and effective means for covering the top end of a golf bag to protect the contents thereof, when required.

A further object of the invention is to provide an improved protective cover for use with a golf bag, particularly when mounted on a golf cart, the cover being inexpensive to manufacture, being durable in construction, being relative compact in size, and providing an effective means for protecting the contents of a golf bag but being easily movable to a non-interfering position when access to the contents of the golf bag is required.

Further objects and advantages of the invention will become apparent from the following description and claim, and from the accompanying drawings, wherein:

Figure 1 is a side elevational view of a golf cart having a golf bag mounted thereon and being provided with a protective cover device according to the present invention.

Figure 2 is an enlarged perspective fragmentary view showing the pivoted hinge leaf member associated with the rim of the cover of Figure 1 and illustrating the clamping collar provided therewith for attaching same to the pivoted handle of a golf cart.

Figure 3 is a fragmentary side elevational view showing a protective cover according to the present invention installed on the top end of a golf bag and illustrating a modified form of the present invention.

Figure 4 is an enlarged perspective view of the components of the device shown in Figure 3 and illustrating the hinge clip element detached from the main portion of the cover member.

Referring to the drawings, and more particularly to Figures 1 and 2, 11 generally designates a conventional golf cart of the type having a pivoted handle 12 which is pivotally connected at 13 to the frame of the cart. The golf cart is adapted to support a golf bag 14, the bag being secured on the cart by suitable retaining members 15, 15 surrounding the bag and retaining the bag on the bottom supporting member 16 of the cart.

Designated generally at 17 is a cover device comprising a rigid rim 18 to which is secured a flexible cap member 19, the cap member being formed with a hem 20 through which the rim member 18 extends, the rim being substantially continuous, and the cap member being of suitable flexible material and being of sufficient size to completely cover the top end of a golf bag 14 in the manner illustrated in Figure 1.

The flexible cover 19 is notched at a portion thereof, shown at 21 in Figure 2, exposing a portion of the rim 18. Designated at 22 is a hinge leaf member formed with a sleeve portion 23 which surrounds the exposed portion of rim 18, providing a pivotal connection therewith. A clamping collar 24 is rigidly secured to the hinge leaf 22, said clamping collar being engageable around the pivoted handle 12 of a golf cart at a point adjacent the pivotal connection 13 of the handle to the main body of the cart, as shown in Figure 1. The clamping collar 24 is provided with parallel flanges 25 and 26 adapted to be engaged by a clamping bolt 27 extending through apertures 28 provided in the flanges, the bolt being provided with a wing nut for tightening same and for exerting clamping pressure on the sleeve member 24 to secure said sleeve member to the pivoted handle 12. Thus, the device 17 may be attached to the pivoted handle 12 at a desired position thereon such that the cap member 19 may completely cover the top end of the golf bag 14 mounted in the cart 11.

As shown in dotted view in Figure 1, the cover may be swung to a non-interfering position when its use is not required, the flexible cap portion 19 being sufficiently collapsible so that the cover will lie closely adjacent to the pivoted handle 12 when in its open position.

Referring now the form of the invention illustrated in Figures 3 and 4, 17' generally designates a golf bag cover comprising a rigid rim portion 18' to which is secured a flexible cap 19' of sufficient size to completely cover the top end of a golf bag. The hem of the cap 19' is notched away at diametrically opposite points thereon, as shown at 21' and 22'. Designated at 23' is a hinge clip which is secured to the forward side of the top rim 24' of a golf bag 14', the hinge clip 23' being formed with a resilient transverse channel portion 26' adapted to lockingly interengage with either of the exposed rim portions at the diametrically opposite notches 21' and 22'. Thus, as illustrated in Figure 3, the exposed rim portion at the notch 21' may be lockingly engaged in the transverse resilient channel 26', whereby the cap portion of the device is hinged to the top rim portion 24' of the golf bag and may be swung around the pivot connection provided by the transverse channel member 26' in the manner indicated in Figure 3. Thus, the cap member may be swung to the dotted view position thereof in Figure 3, wherein the top end of the golf bag is completely exposed. When it is desired to protect the contents of the golf bag, the cap member may be swung to the full line position thereof in Figure 3, whereby the golf culbs are completely covered.

As shown in Figure 3, the flexible cap member 19' is not truly symmetrical in shape, but is somewhat asymmetrical, whereby it may be adapted for use with a variety of golf bags of different shape, it being merely necessary to engage the exposed rim portion at either of the notches 21' or 22' with the resilient hinge channel 26' in accordance with the shape and configuration of the golf bag and its contents, and in a maner such that the flexible cap member 19' will best fit the golf bag and will cover the contents thereof. The hinge clip 23' is therefore adapted to be mounted on various different designs of golf bags, the clip being provided with a mounting aperture 30' to receive a fastening bolt, or the like, for securing the clip to the top rim portion 24' of the bag.

The flexible cap member may be formed of any suitable durable flexible material having the required weather-resistant properties, for example, may comprise longitudinally extending panels 31, 31 of water-proof flexible plastic material and side panels 32 of durable, substantially water-proof fabric.

While certain specific embodiments of an improved cover device for use with a golf bag have been disclosed in the foregoing description, it will be understood that various modifications within the spirit of the invention may occur to those skilled in the art. Therefore it is intended that no limitations be placed on the invention

What is claimed is:

A cover member for a golf bag comprising a rigid rim member having diametrically opposed, substantially transversely extending end portions a flexible cap provided with a hem receiving said rim member, said hem being notched away at diametrically opposed end portions thereof so that said rim member is exposed intermediate said diametrically opposed end portions thereof, said cap being asymmetrical between said diametrically opposed end portions thereof, said cover member being of sufficient size to overlie the top end of a golf bag, and a resilient channeled clip member pivotally and clampingly engageable on either one of the exposed rim portions and being provided with an apertured connection leaf element adapted to be secured to the top rim of a golf bag.

References Cited in the file of this patent

UNITED STATES PATENTS

| | | |
|---|---|---|
| 889,539 | Morg | June 2, 1908 |
| 1,562,030 | Lawrence | Nov. 17, 1925 |
| 1,570,510 | McQuirk | Jan. 19, 1926 |
| 1,751,902 | Brown | Mar. 25, 1930 |
| 2,520,226 | Smith | Aug. 29, 1950 |
| 2,751,955 | Nahon | June 26, 1956 |
| 2,822,143 | Johansen | Feb. 4, 1958 |

FOREIGN PATENTS

| | | |
|---|---|---|
| 353,201 | Great Britain | July 23, 1931 |